United States Patent
Sugiarto et al.

(10) Patent No.: US 7,460,489 B2
(45) Date of Patent: Dec. 2, 2008

(54) WIRELESS MESH NETWORK TIMED COMMIT PROVISIONING

(75) Inventors: Ridwan (Peter) G. Sugiarto, San Ramon, CA (US); Devabhaktuni Srikrishna, San Mateo, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 968 days.

(21) Appl. No.: 10/896,219

(22) Filed: Jul. 21, 2004

(65) Prior Publication Data
US 2006/0018303 A1 Jan. 26, 2006

(51) Int. Cl.
*H04L 12/28* (2006.01)

(52) U.S. Cl. ............... 370/254; 370/230; 455/161.3; 455/226.2

(58) Field of Classification Search ............... 370/352, 370/338, 401, 428, 254; 455/446, 509, 434, 455/418
See application file for complete search history.

(56) References Cited

U.S. PATENT DOCUMENTS

| | | | |
|---|---|---|---|
| 5,557,748 A | 9/1996 | Norris | |
| 6,697,360 B1 | 2/2004 | Gai et al. | |
| 2005/0192037 A1* | 9/2005 | Nanda et al. | 455/509 |
| 2007/0127417 A1* | 6/2007 | Kalika | 370/338 |

* cited by examiner

*Primary Examiner*—Fan Tsang
*Assistant Examiner*—Simon King
(74) *Attorney, Agent, or Firm*—Brian R. Short

(57) ABSTRACT

Methods and systems are disclosed for managing a network. The management includes storing configuration parameters in cells within the network, sending a commit command and a commit delay time to the cells, sensing failed reception of the commit command, and aborting the commit command if a failure is sensed.

33 Claims, 6 Drawing Sheets

WIRELESS MESH NETWORK TIMED COMMIT PROVISIONING

FIELD OF THE INVENTION

The invention relates generally to communication networks. More particularly, the invention relates to wireless mesh network timed commit provisioning.

BACKGROUND OF THE INVENTION

Wireless access devices are becoming more prevalent. Wireless access can be implemented in many different forms, including connecting a wireless access device (client) through a wireless mesh network that provides connection to a wired network. FIG. 1 shows a wireless network that includes client devices 130, 140. The network provides the clients 130, 140 access to the internet 100. For example, a first client device 130 is provided access to the internet 100 through a wireless connection to a router 110, and through a wired network 105, and a second client is provided access to the internet 100 through a wireless connection to a router 120, and the wired network 105. The wireless connection between the router 110 and the client 130 can be defined by a downlink connection 140 (in which data traffic flows from the router 110 to the client 130), and by an uplink connection 150 (in which data traffic flows from the client 130 to the router 110).

Proper operation of the wireless network requires wireless devices of the network (including various forms of routers) to have proper wireless network configuration parameters. The network configuration parameters include, for example, a wireless routing domain (WRD), transmission rates, encryption information, and available link information.

The required or desired wireless network parameters can change over time. For example, the encryption, WRD and link information can change over time, requiring the network configuration parameters to be updated to reflect the changes.

The update or modification in the configuration parameters can be controlled by an operator. The operator can modify the configuration parameters based upon metrics of the network that reflect performance of the network.

It is desirable to have a method and apparatus for wireless networking that provides for proper network configuration parameters, and proper updating of the network configuration parameters.

SUMMARY OF THE INVENTION

An embodiment of the invention includes a method of managing a network. The method includes storing configuration parameters in cells within the network, sending a commit command and a commit delay time to the cells, sensing failed reception of the commit command, and aborting the commit command if a failure is sensed.

Another embodiment of the invention includes a method of a Network Management System (NMS) managing a wireless mesh network. The method includes the NMS storing wireless configuration parameters in cells within the wireless mesh network, the NMS sending a commit command and a commit delay time to the cells, the NMS sensing failed reception of the commit command, and the NMS aborting the commit command if a failure is sensed.

Another embodiment of the invention includes a wireless network management system (NMS). The NMS includes a means for storing configuration parameters to gateways and access node within the a wireless network, a means for sending a commit command and a commit delay time to the gateways and access nodes, a means for sensing failed reception of the commit command, and a means for aborting the commit command if a failure is sensed.

Other aspects and advantages of the present invention will become apparent from the following detailed description, taken in conjunction with the accompanying drawings, illustrating by way of example the principles of the invention.

DETAILED DESCRIPTION

Figure 1:
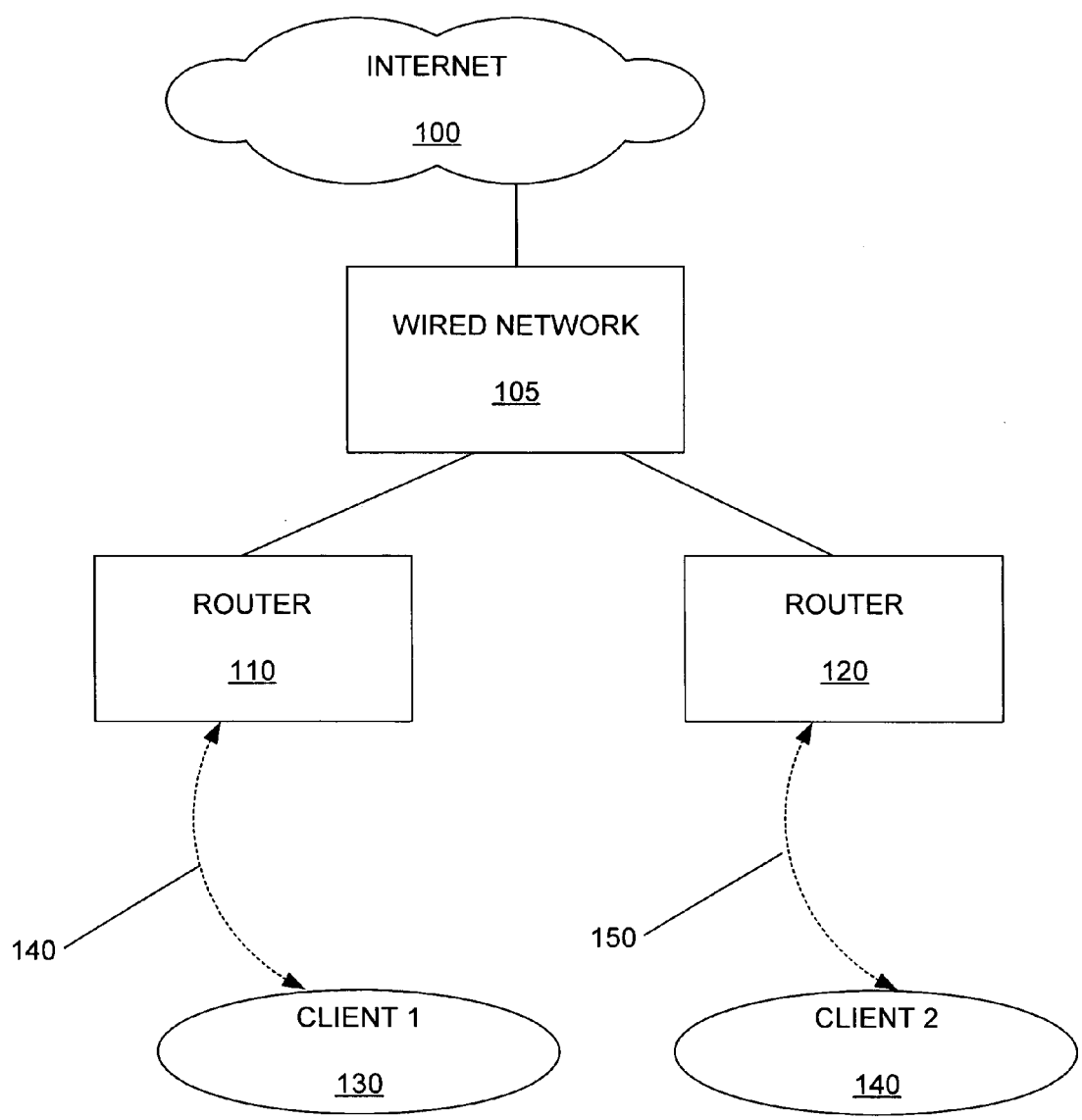
FIG. 1 shows clients connected to a network.

As shown in the drawings for purposes of illustration, the invention is embodied in methods and apparatus for managing configuration parameters of a network.

Figure 2:
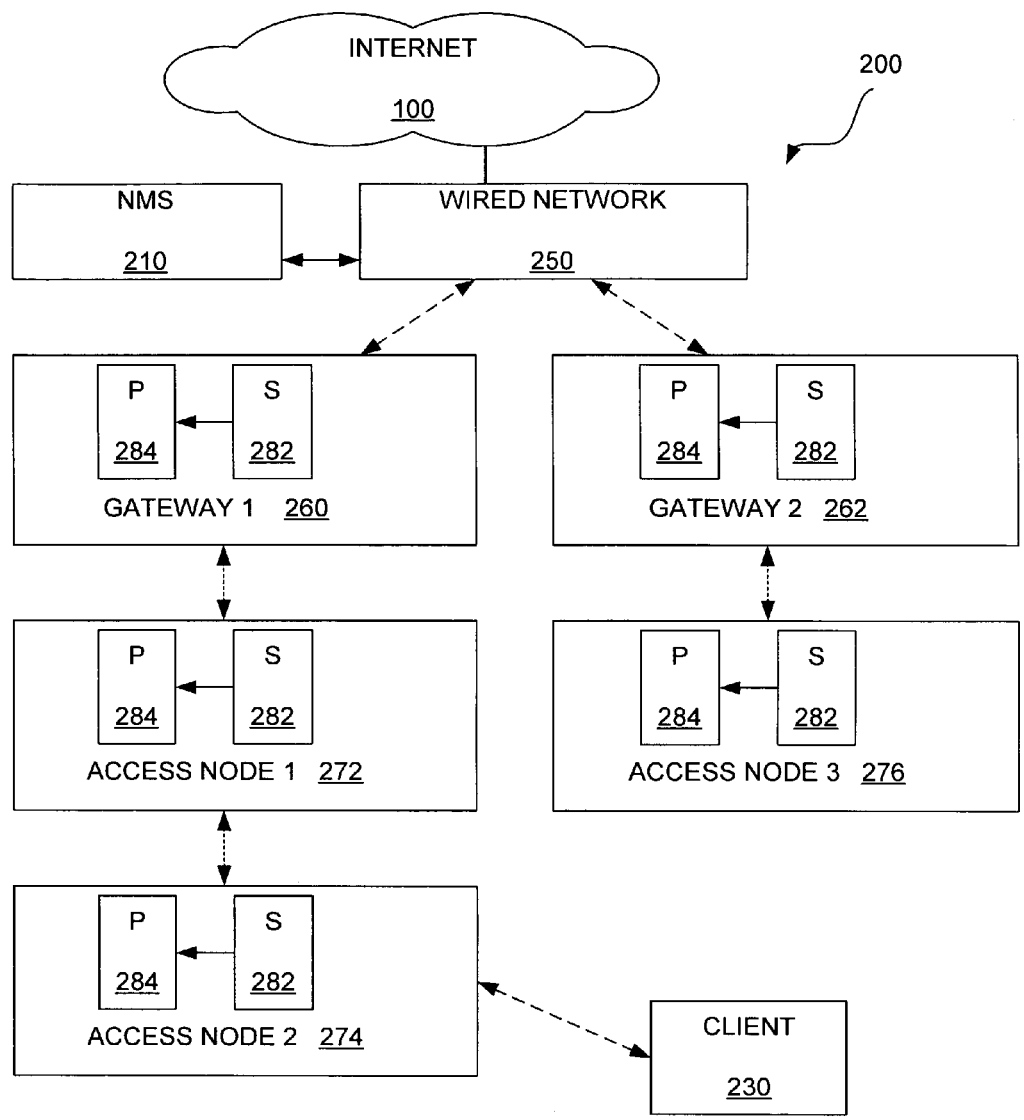
FIG. 2 shows a wireless mesh network and an associated network manager.

FIG. 2 shows a wireless mesh network 200 and an associated network manager system (NMS) 210. A client 230 is connected to the internet 100 through a wired network 250, a first gateway 260, a first access node 272 and a second access node 274. The mesh network 200 additionally includes a second gateway 262 and a third access node 276, however, it is to be understood that the mesh network 200 can include any number of additional gateways and access nodes. The wired network 250 provides a wired connection to the internet 100.

The gateways 260, 262 and access nodes 273, 274, 276 include configuration parameters that determine the operations of the gateways and the access nodes. Typically, the NMS 210 determines how and when the configuration parameters are updated. The network configuration parameters provide control over the mesh network including channel selections for links within the mesh network, encryption of data of the mesh network, and routing control messages.

The client 230 can be any type of computing device, such as, a laptop, personal computer, cell phone or personal digital assistant (PDA). The client 230 should be able to communicate over available transmission channels of the network 200.

Access nodes are devices having one or more network interfaces, and are capable of routing data traffic. An access node can provide a client device (such as client 230) with a network connection.

The gateways provide the access nodes with a data path to an upstream network. As will be described later, an exemplary embodiment of the gateways includes the gateways being an originator of beacons. The gateway can be wire connected, or wirelessly connected to the network 205. The beacons are routing packets that carry information about routing paths. The beacons are transmitted from the gateways for reception by the access nodes. Access nodes that are able to receive the beacons from a particular gateway can route data to that gateway if the access node selects the gateway over other gateways that also transmit beacons (which can be over the same transmission channel, or a different transmission channel). Generally, the access nodes receive routing beacons, select a routing path, modify the beacons, and retransmit the modified beacons for reception by other downstream devices (downstream devices can be other access nodes or clients).

The NMS 210 can be located remotely. The NMS 210 typically provides a network operator with the ability to control network, including control over the network configuration parameters. The NMS 210 can also be configured to provide automatic control over at least some of the network configuration parameters. For example, the NMS 210 can provide automatic control over transmission channel selections of links within the network. If a determination is made that a particular transmission channel is undesirable due to interference, the transmission channels throughout the network can be updated by the NMS 210 by changing the network configuration parameters to reduce the effects of the interference. The NMS 210 can also provide automatic control over encryption of data of the network, and over the routing control messages.

A method for updating the wireless parameters of the mesh network includes a two-phase commit method in which present wireless configuration parameters are update with stored wireless configuration parameters. The update occurs when the gateways and access node receive a "commit" command from the NMS.

A two-phase commit protocol is often used in system where transactions involve multiple server applications on multiple computers. In general, the two-phase commit protocol centralizes the decision to commit. In a typical implementation, a commit manager (such as an NMS) has centralized control of the decision to commit. Other participants in the transaction, such as gateways and access node of a network associated with the NMS, are referred to as subordinate nodes. In a first phase of the commit, the commit manager sends network configuration parameters to the subordinate nodes. In the second phase, the commit manager orders all of the subordinate nodes to commit network configuration parameters from stored memory to active memory.

As shown, each of the gateways 260, 262 and each of the access nodes 272, 274, 276 of the mesh network include both stored configuration parameters 282 and present configuration parameters 284. The present configuration parameters 284 are the wireless configuration parameters that each of the wireless devices is presently using. The stored configuration parameters 282 are wireless parameters that are intended for future use as determined by the NMS 210 sending a commit command.

The two-phase commit can be problematic, however, if all of the gateways and access nodes of the mesh network 200 are not simultaneously updated. For example, it is very possible that one or more of the links of the mesh network are not consistent and reliable. That is, the data path between the NMS 210 and an access node, for example, may unreliable, resulting in the access node missing a "commit" command sent by the NMS. If the access node misses the "commit" command, the access node will have a different set of wireless configuration parameters than the rest of the mesh network 200 that was updated. The access node is essentially eliminated from the mesh network 200 because the access node can no longer communicate with the other access nodes and gateways of the mesh network 200. Gateways and access nodes that have missed the commit still have the old network configuration parameters, and therefore, don't know the new transmission channels, the new encryption keys or new routing control messages. Without knowledge of the available transmission channels and the encryption key, there is no way for these gateways and access nodes to properly communicate with the rest of the network. Clearly, this is an undesirable situation.

Commit Command and Associated Commit Time Delay

To alleviate the problem of some portions (cells that include gateways and access nodes) of the network 200 not receiving the commit command, a commit time delay can be sent by the NMS 210 to all cells. The commit time delay provides time for the NMS 210 to determine whether any cells of the network 200 do not receive the new network configuration parameters, or the commit command. If the determination is made that some cells did not receive either the new network configuration parameters or the commit command, the NMS 210 transmits (sends) an abort command to all of the cells of the network. The abort command prevents the commit command sent to all of the cells from being executed. Therefore, ideally, all of the cells maintain the same network configuration parameters. That is, the commit command is not executed, and the present (active) network configuration parameters don't change. A form of the abort command includes a reset command. More specifically, aborting includes the NMS sending a reset a command that essentially undoes a previously submitted command, such as, a commit command.

The commit time delay should be long enough that the NMS 210 is able to determine whether the commit command was received by all of the cells, and then successfully abort the commit command to all of the cells if required. The successful reception of the commit command can be determined, for example, by the NMS 210 sending a request to all of the access nodes and gateways prompting a response to determine whether the commit command was received. More specifically, sensing failed reception can include requesting each cell to repeat back an earlier sent command, and the NMS 210 not receiving a proper response to the request from all of the cells within the network. The lack of a response suggests to the NMS 210 that the commit command was not received by the devices (gateways and access nodes) that don't respond to the request by the NMS 210.

The commit is a very disruptive process. That is, the commit changes the way that devices (gateways, access nodes) communicate within the network 200. Therefore, it is desirable to have the commit command executed by all the devices as closely in time as possible. If all of the devices are synchronized, the commit command and commit delay time can include a specific time the commit is to be executed. If the devices are not synchronized, the commit command can be associated with a variable commit delay time, in which the commit delay time is varied depending upon an estimated time in which the commit command will be received by the various devices within the network 200. The generally idea is to adjust the commit delay time for each device so that the actual commit is executed by all of the devices at approximately the same time, thereby causing the least amount of disruption of the network 200.

Figure 3:
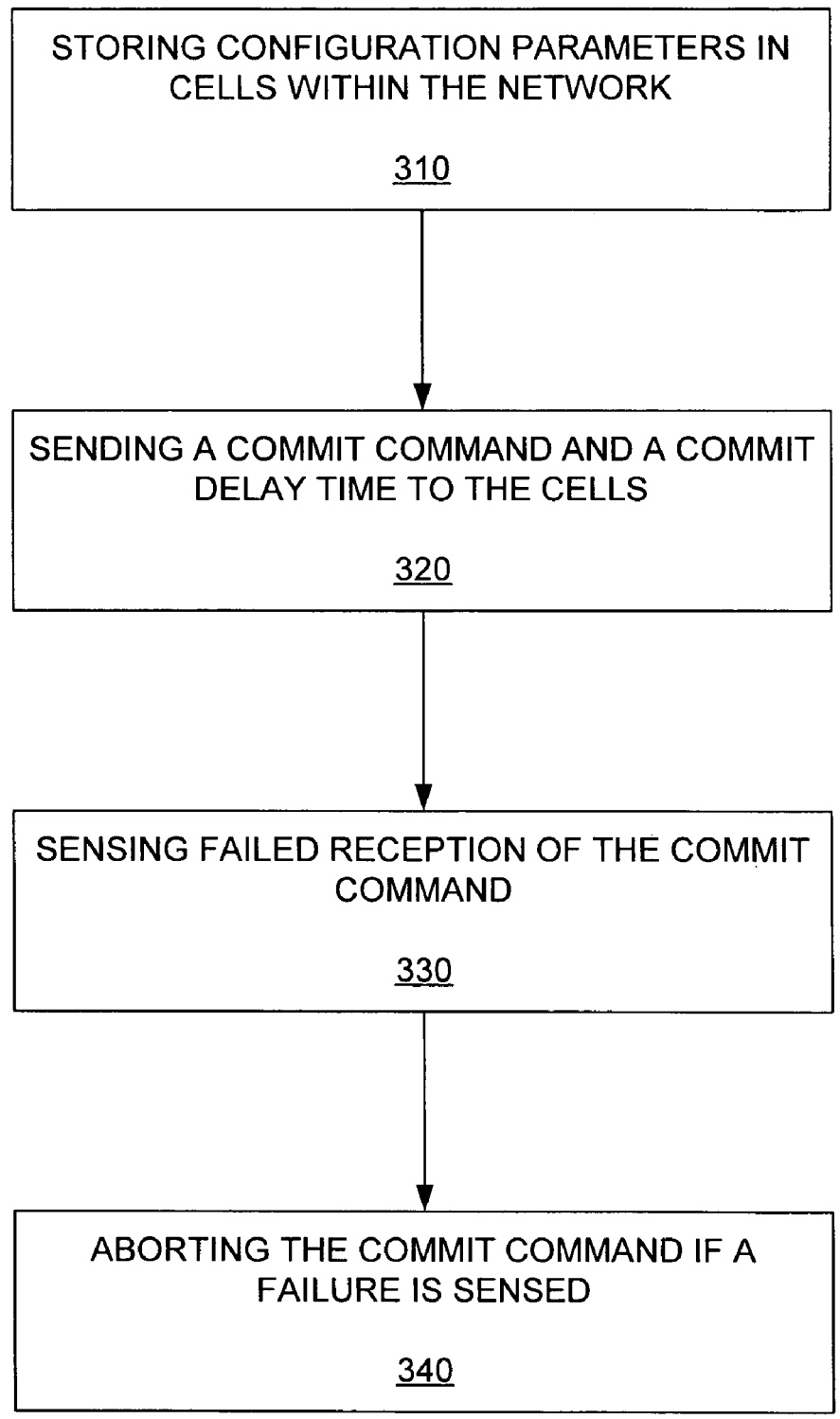
FIG. 3 is a flow chart showing a method of managing a wireless mesh network.

FIG. 3 is a flow chart showing a method of managing a wireless mesh network. A first step 310 includes storing configuration parameters in cells within the network. A second step 320 includes sending a commit command and commit delay time to the cells. A third step 330 includes sensing failed reception of the commit command. A fourth step 340 includes aborting the commit command if a failure is sensed.

The NMS stores the configuration parameters within stored parameters memory of the access nodes and gateways of the cells. The configuration parameters are selected bases upon a current state of the network.

The commit command causes the configuration parameters of the stored parameter memory to be transferred to the present memory. However, a commit delay time is also sent by the NMS. The commit delay time provides a delay between when the commit command is received by the gateways and access nodes, and when the commit command is actually executed. The delay is provided to allow the NMS enough time to determine whether all of the gateways and access nodes within cells of the network have received the new network configuration parameters and the commit command. The new configuration parameters, the commit command and the commit time delay can all be sent by the NMS simultaneously.

One way in which the NMS can determine whether there has been a failed reception of the commit command, includes the NMS requesting all of the cells (gateways and access nodes) to repeat back to the NMS the last command received from the NMS. The request provides the NMS with enough information to make a determination whether each of the cells received the commit command. If a particular cell is not receiving commands from the NMS, the cell will not respond to the NMS request. The NMS can deduce that the commit command was not received.

If the NMS determines that one or more of the cells failed to receive the commit command, the NMS aborts the commit command. This includes sending an abort command to all of the cells within the network.

Events that can cause the NMS to update the network configuration parameters includes transmission channel updates, data encryption updates and routing control updates. This is not an inclusive list, and other network parameters can also be desirably updated.

Figure 4:
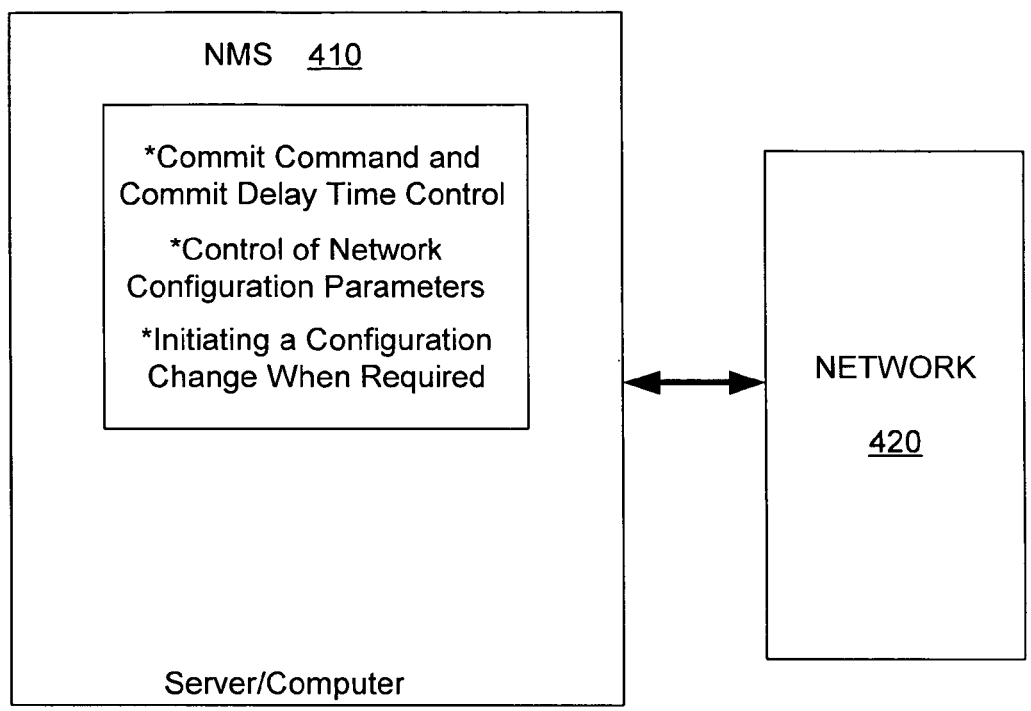
FIG. 4 shows a block diagram of a Network Management System (NMS).

FIG. 4 shows a block diagram of a Network Management System (NMS) 410. The NMS 410 is generally a computer program that is operable on a server connected to a network 420 the NMS 410 is controlling. The NMS 410 provides management of the wireless mesh network 420. The NMS 410 can provide network management, address management, monitoring, performance tracking, configuration management and security functions. As previously described, the NMS 410 controls the network configuration parameters. This includes controlling the sending of network configuration parameters, and the sending of the commit command and associated commit time delay. Additionally, this can also include determining when new network configuration parameters are desirable.

Figure 5:
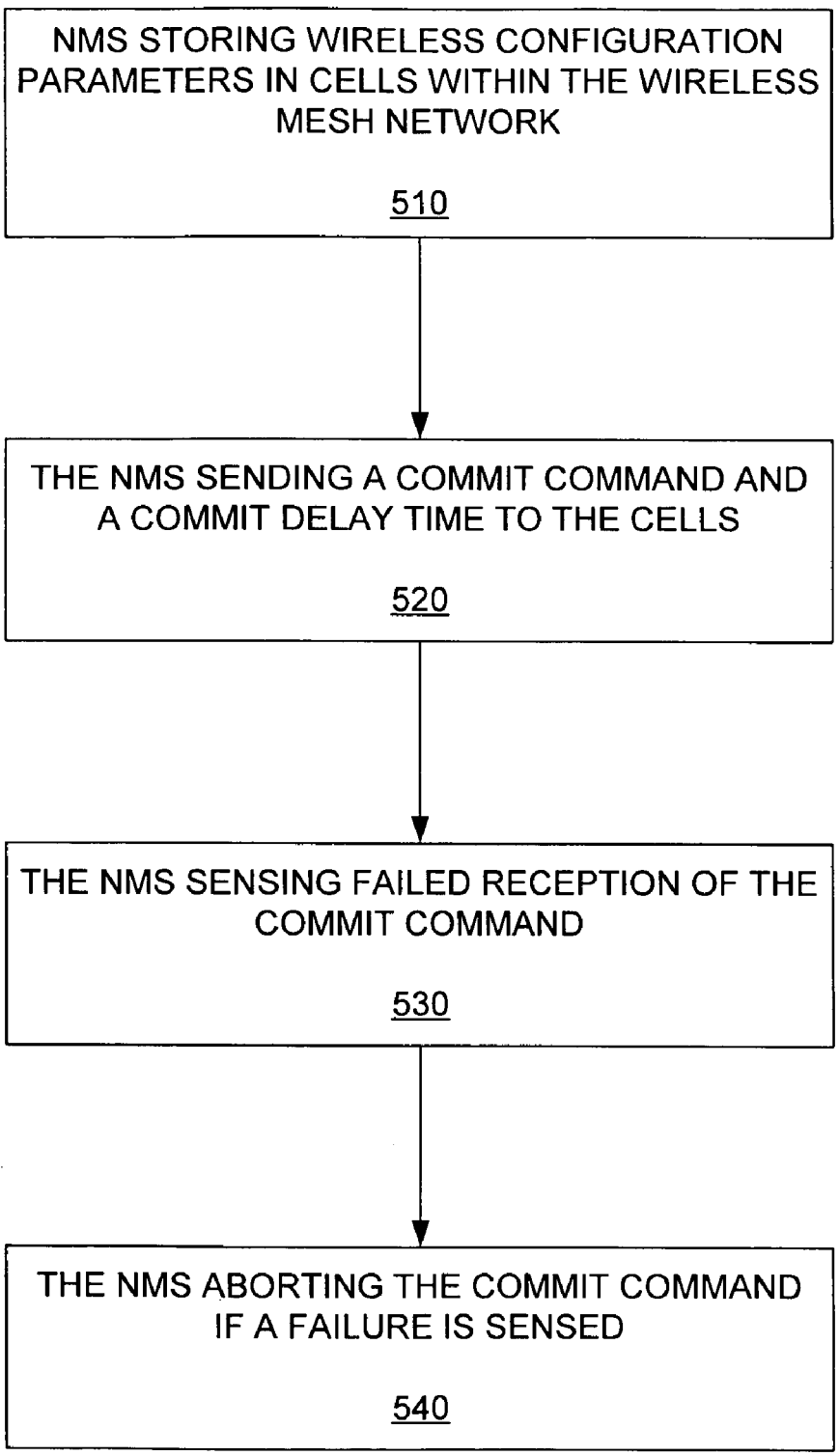
FIG. 5 is a flow chart showing another method of managing a wireless mesh network.

FIG. 5 is a flow chart showing a method of an NMS managing a network. The method includes a first step 510 in which the NMS stores wireless configuration parameters in cells (for example, gateways and access nodes) within the wireless mesh network. A second step 520 includes the NMS sending a commit command and a commit delay time to the cells. A third step 530 includes the NMS sensing failed reception of the commit command. A fourth step 540 includes the NMS aborting the commit command if a failure is sensed.

Channels Selections Updates

Figure 6:
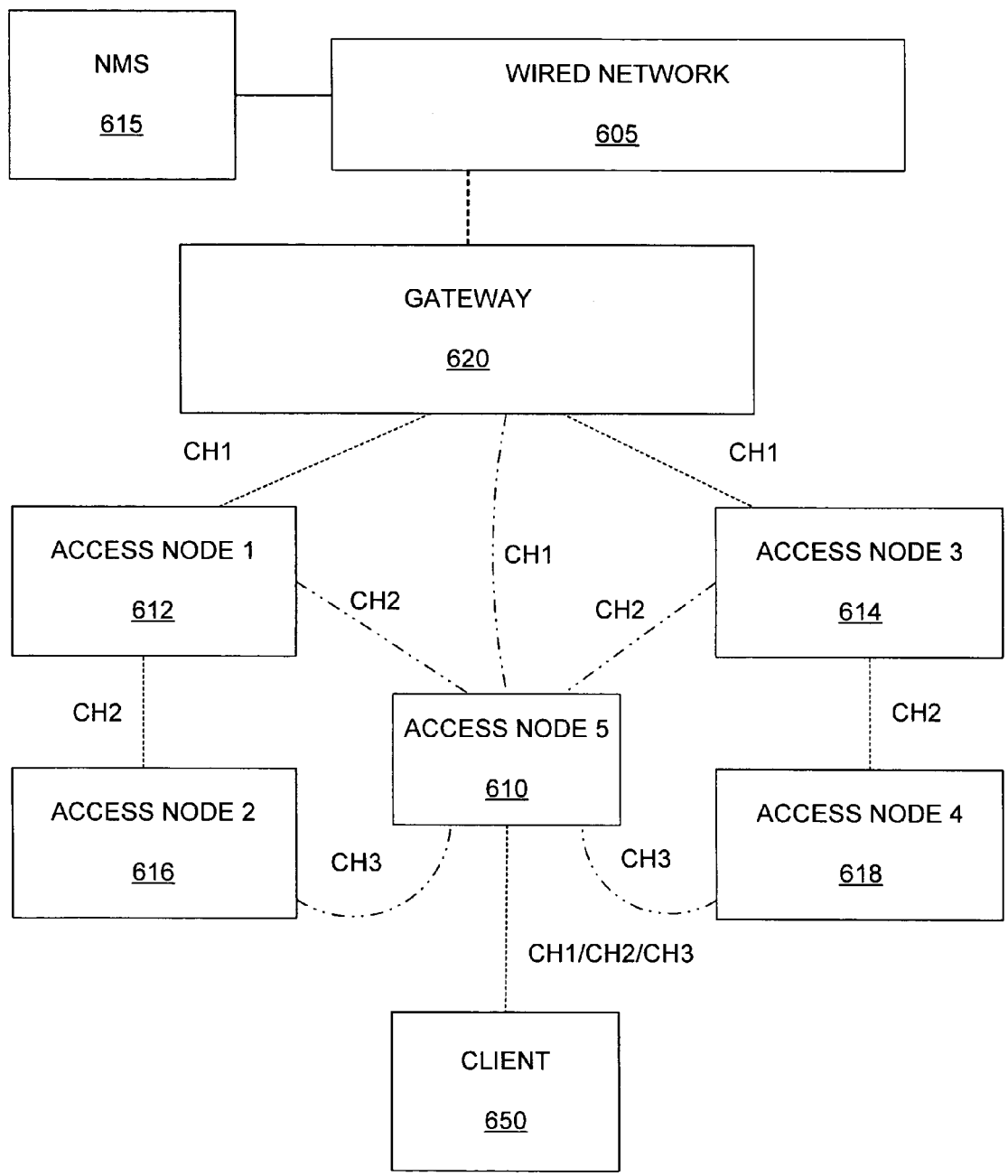
FIG. 6 shows a wireless mesh network, an associated network manager, and channel assignments within the wireless mesh network.

FIG. 6 shows a wireless mesh network, an associated network manager (NMS) 615, and channel assignments within the wireless mesh network. Events that can prompt the NMS 615 to update the network configuration parameters include new channel selections within the network, new data encryption or new routing control message.

An access node 610 receives beacons over multiple channels, allowing the access node 610 to make an uplink channel selection. The mesh network includes the NMS 615, a gateway 620, access nodes 610, 612, 614, 616, 618, a client 650, and a network 605.

Three different channels (CH1, CH2, CH3) are shown in FIG. 6. An embodiment includes the channels being different, allowing them to be selected to minimize interference between the channels. Another embodiment includes the channels being the same for simplicity. A channel can be defined as a mode of transmission that allows different channels to be distinguishable. Depending upon conditions of the network, different channel selections can be desirable. If the network senses that a change in channels (of each of the links of the mesh network) is desirable, the NMS 615 updates the network configuration parameters to realize the change in channels.

An embodiment of the network includes the gateway 620 being an originator of beacons. The gateway 620 can be wire connected, or wirelessly connected to the network 605. The beacons are routing packets that carry information about routing paths. The beacons are transmitted from the gateway 620 for reception by the access nodes. Access nodes that are able to receive the beacons from the gateway 620, can route data to the gateway 620 if the access node selects the gateway 620 over other gateways that also transmit beacons (which can be over the same channel (CH1), or different channels). Generally, the access nodes receive routing beacons, select a routing path, modify the beacons, and retransmit the modified beacons for reception by other downstream devices (downstream devices can be other access nodes or clients). An upstream path is a data path between a device (access node or client) and a gateway. A downstream path is in the opposite direction as an upstream path.

As shown in FIG. 6, the gateway 620 transmits beacons over a first channel (CH1). Access nodes 612, 614 both receive the beacons over the first channel (CH1). The access nodes 612, 614 are generally referred to as first layer access nodes, and are one hop from the gateway 620. The access nodes 612, 614 modify the beacons to include their routing information and the hop count (hop count of one). The routing information provides a data path back to the gateway 620. The modified beacons are retransmitted over a second channel (CH2). As previously mentioned, the second channel (CH2) can be either the same, or different than the first channel (CH1) depending upon the desired implementation of the network.

Second layer access nodes 616, 618 receive the modified beacons over the second channel (CH2). The second layer access nodes 616, 618 have a hop count of two. The second layer access nodes 616, 618 again modify the received beacons to include their routing information, and the new hop count (hop count of two). The second layer access nodes 616, 618 retransmit the modified beacons over a third channel (CH3). As previously mentioned, the third channel (CH3) can be either the same, or different than the first channel (CH1) and the second channel (CH2) depending upon the desired implementation of the network.

As shown in FIG. 6, access node 610 can receive beacons from the gateway 620 over the first channel (CH1), from the first layer access nodes 612, 614 over the second channel (CH2), and from the second layer access nodes 616, 618 over the third channel (CH3). Generally, the access node 610 performs a quality check on the received beacons, and selects the upstream data path connection based upon the quality check. The selection determines the uplink channel selection of the access node 610. That is, if the beacons received from the gateway 620 are determined to be the best quality, the first channel (CH1) is selected as the uplink channel, if beacons from either of the first layer access nodes 612, 614 are determined to be the best quality, the second channel (CH2) is selected as the uplink channel, and if the beacons received from the second layer access nodes 616, 618 are determined to be the best quality, the third channel (CH3) is selected as the uplink channel.

An embodiment of the access node 610, includes the access node 610 periodically switching its uplink channel to determine whether the quality of the beacons over different channels has changed. If a beacon over a different channel than the present becomes better than the present one, the access node can change its uplink channel selection. Of course, the uplink channel re-selection will typically require a new downlink channel selection as well. A similar embodiment includes the access node simultaneously receiving over all available channels during normal operation. That way, the access node 610 can determine if a better channel is available while not interrupting on going communication with downstream devices. Simultaneous reception can be implemented with multiple radios or through the use of a wideband receiver. If better channel selections are determined, the NMS 615 can update the network configuration parameters.

Another embodiment of the access node 610, includes the access node 610 periodically re-transmitting the modified beacons over different channels. That way, a downstream device receiving beacons over a different channel than the channel the access node 610 is presently transmitting, may determine that the present channel of the access node 610 is better than the channel the downstream device is presently using as its uplink (potentially through a different upstream device). If better channel selections are determined, the NMS 615 can update the network configuration parameters.

As shown, the channel selections can be made so that different channels are assigned to consecutive links within each of the data paths of the wireless mesh network. A data path is generally defined as path that data travels between a device (access node or client) and a gateway. The channel selections follow predetermined sequences in order to minimize interference between the transmission links.

The channel selection between the access node 610 and the client 650 is made by the access node 610. The selection is based upon the predetermined sequence of channel links. Depending upon the uplink channel of the access node 610, the downlink channel will be, for example, either the first channel (CH1) (if the uplink channel is the third channel (CH3)), the second channel (CH2) (if the uplink channel is the first channel (CH1)), or the third channel (CH3) (if the uplink channel is the second channel (CH2)).

As stated, the selected paths are determined by the quality of the beacons received by an access node. The quality selection can be based upon bit error rate (BER), packet error rate (PER), or signal to noise ration (SNR) of the received beacons. The quality selection can be based upon a history of beacons received by the access nodes from any (or all) other access nodes and gateways. The history can be incorporated over multiple time scales and be used to make a judgment about the quality and reliability of a path advertised by a beacon. The quality selection may also be based on a variety of other factors including (wired) bandwidth available at the gateway and interference or congestion within the wireless network.

Beacons can be received from multiple gateways or access nodes. In one embodiment, the beacons can be received by an access node on multiple channels. The access node can periodically witch its receive channel in order to receive the beacons over the multiple channels. In another embodiment, each access node periodically switches its beacon transmit channel so that beacons can be sent on all available channels.

Data Encryption Selection Updates

A standard encryption is wired equivalent privacy (WEP) encryption. The encryption can be periodically updated to provide a secure wireless mesh network. The NMS can include a timed updates (such as, an hour, day, week or month) in which the frequency of the update is dependent upon the desired level of security of the network. The NMS updates the wireless network configuration parameters each time the encryption of the data is to be updated. Clearly, all of the devices must be updated (otherwise, the devices would not longer be able to communicate with each other) and the updates for all of the devices desirably occurs at approximately the same time to minimize the disruption caused by the update.

Routing Control Message Updates

Routing control messages, such as, the wireless routing domain (WRD) generally include their own coding. The WRD is required to prevent unwanted associations with other networks. That is, neighboring unrelated networks should not include overlapping routing. The networks are desirably separate and secure from each other. Updating the WRD periodically or repeatedly helps to prevent unwanted associations. Like the encryption updating previously described, the NMS can include a timed WRD updates (such as, an hour, day, week or month) in which the frequency of the update is dependent upon the desired level of security of the network.

Although specific embodiments of the invention have been described and illustrated, the invention is not to be limited to the specific forms or arrangements of parts so described and illustrated. The invention is limited only by the appended claims.

What is claimed:

1. A method of managing a network comprising:
   storing configuration parameters in cells within the network;
   sending a commit command and a commit delay time to the cells;
   sensing failed reception of the commit command, wherein sensing failed reception comprises:
   requesting each cell to repeat back an earlier sent command; and
   not receiving a proper response to the request from all of the cells within the network; and
   aborting the commit command if a failure is sensed.

2. The method of claim 1, wherein storing configuration parameters comprises storing the configuration parameters within stored memory of devices of the cells.

3. The method of claim 1, wherein the commit command causes devices within the cells to transfer configuration parameters from stored memory to present memory.

4. The method of claim 3, wherein configuration parameters stored in present memory determine configurations of the devices within the cells.

5. The method of claim 3, wherein the devices within the cells include gateways and access nodes.

6. The method of claim 5, wherein the gateways and access node provide a client with a data path to an internet network.

7. The method of claim 1, wherein the commit delay time is determined by an amount of time required to successfully abort the commit command.

8. The method of claim 1, wherein the commit delay time is determined by an amount of time required to successfully abort the commit command of all cells within the network.

9. The method of claim 6, wherein the amount of time required to successfully abort the commit command is dependent upon a size of the network.

10. The method of claim 1, wherein the configuration parameters and the commit command are sent simultaneously in time.

11. The method of claim 1, wherein the commit delay time is variable for different cells within the network, so that the commit command is executed by the different cells at approximately the same time.

12. The method of claim 1, wherein new network configuration parameters are stored within cells of the network, and corresponding commit command and commit time delay sent when transmission channel updates are determined to be desirable.

13. The method of claim 1, wherein new network configuration parameters are stored within cells of the network, and corresponding commit command and commit time delay sent when new data encryption is determined to be desirable.

14. The method of claim 1, wherein new network configuration parameters are stored within cells of the network, and corresponding commit command and commit time delay sent when new routing control messages are determined to be desirable.

15. A method of Network Management System (NMS) managing a wireless mesh network comprising:
   the NMS storing wireless configuration parameters in cells within the wireless mesh network;
   the NMS sending a commit command and a commit delay time to the cells, the commit delay allowing the NMS to determine whether any of the cells did not receive the commit command before execution of the commit command;
   the NMS sensing failed reception of the commit command; and
   the NMS aborting the commit command if a failure is sensed.

16. The method of claim 15, wherein storing configuration parameters comprises storing the configuration parameters within stored memory of devices of the cells.

17. The method of claim 15, wherein the NMS and cells within the network are interconnected according to an SNMP protocol.

18. The method of claim 15, wherein the wireless configuration parameters comprise at least one of wireless routing domain (WRD), WEP, and transmission channels.

19. The method of claim 15, wherein the commit command causes wireless devices within the cells to transfer wireless configuration parameters from stored memory to present memory.

20. The method of claim 19, wherein configuration parameters stored in present memory determine configurations of the devices within the cells.

21. The method of claim 19, wherein the wireless devices within the cells include at least one of wireless gateways and wireless access nodes.

22. The method of claim 21, wherein the wireless gateways and wireless access node provide a wireless client with a data path to an internet network.

23. The method of claim 15, wherein sensing failed reception comprises:
   the NMS requesting each device within the cells to repeat back an earlier sent command; and
   not receiving a proper response to the request from all of the cells within the network.

24. The method of claim 15, wherein the commit delay time is determined by an amount of time required for the NMS to successfully abort the commit command of all cells within the network.

25. The method of claim 24, wherein the amount of time required to successfully abort the commit command is dependent upon a size of the network.

26. The method of claim 15, wherein the wireless configuration parameters and the commit command are sent simultaneously in time.

27. The method of claim 15, wherein the commit delay time is variable for different cells within the network, so that the commit command is executed by the different cells at approximately the same time.

28. The method of claim 15, wherein new network configuration parameters are stored within cells of the network, and corresponding commit command and commit time delay sent when transmission channel updates are determined to be desirable.

29. The method of claim 15, wherein new network configuration parameters are stored within cells of the network, and corresponding commit command and commit time delay sent when new data encryption is determined to be desirable.

30. The method of claim 15, wherein new network configuration parameters are stored within cells of the network, and corresponding commit command and commit time delay sent when new routing control messages are determined to be desirable.

31. A managed wireless network comprising:
   a network management system (NMS);
   a plurality of gateways in communication with the NMS;
   a plurality of access node in wireless communication with the gateways, the access node providing clients with data paths through the gateways to upstream networks;
   the NMS operable to:
      storing configuration parameters in gateways and access node within the wireless network;
      sending a commit command and a commit delay time to the gateways and access nodes, the commit delay allowing the NMS to determine whether any of the cells did not receive the commit command before execution of the commit command;
      sensing failed reception of the commit command; and
      aborting the commit command if a failure is sensed.

32. A wireless network management system (NMS) comprising:
   means for storing configuration parameters in gateways and access node within the a wireless network;
   means for sending a commit command and a commit delay time to the gateways and access nodes, the commit delay allowing the NMS to determine whether any of the cells did not receive the commit command before execution of the commit command;
   means for sensing failed reception of the commit command; and
   means for aborting the commit command if a failure is sensed.

33. A network management product comprising a computer program, the computer program operable to control a network, when executed, that computer program causing the network to:
   store configuration parameters in gateways and access node within the a wireless network;
   send a commit command and a commit delay time to the gateways and access nodes, the commit delay allowing the NMS to determine whether any of the cells did not receive the commit command before execution of the commit command;
   sense failed reception of the commit command; and
   abort the commit command if a failure is sensed.

* * * * *